United States Patent
Pizzi et al.

(10) Patent No.: US 7,401,335 B2
(45) Date of Patent: Jul. 15, 2008

(54) SINGLE STACK KERNEL

(75) Inventors: Robert Gregory Pizzi, Sunnyvale, CA (US); Brian Nash, Swindon (GB)

(73) Assignee: Wind River Systems, Inc., Alameda, CA (US)

( * ) Notice: Subject to any disclaimer, the term of this patent is extended or adjusted under 35 U.S.C. 154(b) by 862 days.

(21) Appl. No.: 10/377,938

(22) Filed: Feb. 28, 2003

(65) Prior Publication Data
US 2004/0172633 A1 Sep. 2, 2004

(51) Int. Cl.
*G06F 9/46* (2006.01)
(52) U.S. Cl. ...................... 718/104; 718/100
(58) Field of Classification Search .............. 718/100, 718/104; 712/1
See application file for complete search history.

(56) References Cited
U.S. PATENT DOCUMENTS
2002/0072830 A1* 6/2002 Hunt ........................ 701/1
2003/0204549 A1* 10/2003 Eibach et al. ............... 709/102

OTHER PUBLICATIONS
Feldman, James M. and Retter, Charles T., Computer Architecture: A Design's Text Based on a Generic RISC, 1994, Co-published by the MIT Press and McGraw-Hill, Inc., p. 126.*

* cited by examiner

*Primary Examiner*—Meng-Al T. An
*Assistant Examiner*—Kenneth Tang
(74) *Attorney, Agent, or Firm*—Fay Kaplun & Marcin, LLP

(57) ABSTRACT

A system for allocating memory for execution of computational tasks in an embedded device is described. The system uses a single stack to store the runtime memory for an executing task, and the context for selected suspended tasks, pointers are dynamically set to indicate top of stack locations for the tasks, and context locations for suspended tasks. The amount of memory in the stack is optimized during run time to use the least memory necessary.

30 Claims, 6 Drawing Sheets

SINGLE STACK KERNEL

BACKGROUND INFORMATION

Many modern devices make use of embedded computing, which gives to the devices the ability to optimize their performance, react to their environment, accept instructions and report data, among other things. Embedded computing implies that one or more numerical processors are used in the device, to give it the ability to process data and instructions. Together with the processor often are included memory devices to store data, and various types of input and output interfaces used to exchange data with sensors, with an external processor, etc.

A large market exists for embedded computing devices in the transportation field, and in particular in the automotive field. These devices are used to support all aspects of vehicle operations, ranging from the simple control of power windows and timers to sophisticated engine control systems, traction control and anti-lock brake systems. Until recently devices like these were relatively rare and unsophisticated in the automotive field, however consumers more recently have come to expect modern vehicles to incorporate these "smart" systems. The trend for the future is to develop even more of these smart devices to improve the safety, fuel efficiency and performance of modern automobiles.

One drawback of using embedded computing devices is that the processor and all associated components have to be included in the device. Thus additional memory, sensors, power supply, and any other resources required by the processor to carry out its function have to be packaged with the embedded device. This tends to increase the cost and size of the device, which may increase unacceptably the overall cost of the vehicle. It is therefore important to minimize the amount of resources required to obtain the desired functionality. This can be accomplished by using less expensive resources, or by more efficiently utilizing the available resources of the device. In particular, both cost and size of the device may be reduced by controlling the amount of memory required by the processor to carry out its tasks. Less memory required results in fewer, less expensive memory cards, memory chips or storage devices, which impacts favorably on both the ultimate cost and the size of the device.

SUMMARY

In one exemplary embodiment, the present invention is a system to allocate memory to computational tasks executed by a device, comprising a memory of the device divided in registers, a stack head pointer to indicate locations in the memory, and a set of instructions executable by the device. The set of instructions includes instructions to determine the number of registers used by the tasks, organize the registers in a single stack, assign sets of the registers to individual tasks, set the stack head pointer to specify a top of stack value of an executing task, and modify the assignment of sets of the registers and the stack head pointer after a context switch of the tasks takes place.

In another exemplary embodiment, the invention is a method to allocate memory to computational tasks executing on a device, comprising determining a maximum number of memory registers required by the tasks, defining a single stack region of device memory containing the registers, and assigning sets of registers to each of the tasks. The method also includes ordering the registers for the each of the tasks to optimize access time, defining a stack head pointer to specify a top of stack value of an executing task, and updating the assignment of sets of registers and the stack head pointer when a context switch occurs.

DETAILED DESCRIPTION

Figure 1:
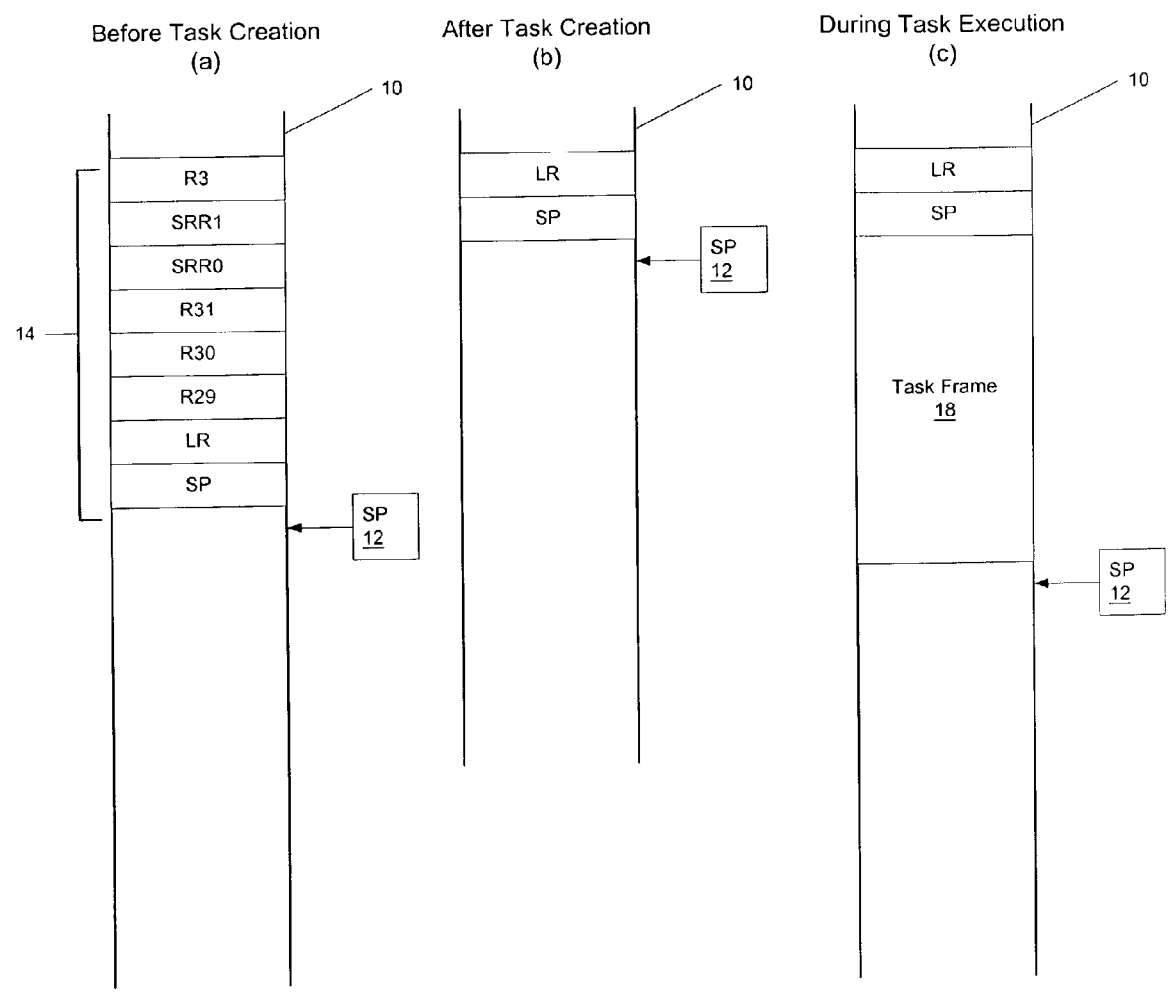
FIG. 1 is a diagram showing a representation of memory registers used by a task in different phases of creation.

The present invention may be further understood with reference to the following description of preferred exemplary embodiments and the related appended drawings, wherein like elements are provided with the same reference numerals. As indicated, a goal in designing embedded computing devices is to reduce the cost and size of the devices, for example by limiting the amount of memory required by the tasks performed by the device's processor. One way to achieve this is to more efficiently manage the use of memory, so that more can be achieved with a given amount of memory, or less memory may be necessary to carry out a specified set of tasks. Efficient memory management thus has the potential to significantly reduce the amount of memory that has to be built into a device, and obtain the desired cost and size savings.

The automotive field is one area where embedded computing devices have become increasingly prevalent. The requirements of increased fuel efficiency dictate reductions in vehicle weight, and competitive price pressures place a cap on the vehicle's price. Accordingly there is a strong incentive to apply memory management improvements to computing devices used in vehicles. Modern vehicles include hundreds of devices that utilize embedded computing capabilities, and thus even modest cost and weight or size improvements of each of these devices can have a significant effect on the overall vehicle. To manage the increasingly complex embedded devices, standardized systems have been developed to program and to interface with the processors embedded therein. One of these is the OSEK standard, developed by a group of major European automotive manufacturers and component suppliers to provide a common embedded development platform for the industry. U.S. and Japanese manufacturers as well are evaluating OSEK, such that it may emerge as the common standard for embedded computing in the automotive industry to manage devices with limited resources.

One method for reducing the memory requirements of an embedded device is to more efficiently manage how the memory is allocated between the tasks carried out by the device. In a typical embedded device, the operating system has a certain amount of memory locations that can be assigned to various computational tasks performed by an embedded processor of the device. The number of tasks varies considerably depending on the complexity of the device and on the specific functions being carried out. For example, an engine control unit may carry out a large number of tasks, such as monitoring engine speed, air flow, fuel flow, etc. A simpler device may only have a few tasks to carry out, but may have correspondingly less memory available to perform those tasks. Optimization of memory allocation thus comports benefits for devices of all levels of complexity.

Conventional operating systems for embedded devices based on the OSEK standard allocate memory to the various tasks carried out by the processor in a static manner, when the system is started up or initialized. Each task that the device can foresee having to carry out is assigned a memory location in a stack, which is sized according to the requirements of the task. The user can perform the allocation before executing the tasks. For example, if there are 5 tasks each requiring 1000 bytes of memory, 5 memory stacks each containing at least 1000 bytes of memory have to be made available to the tasks, for a total of at least 5000 bytes. In this manner each task is assured of having sufficient memory available to be carried out, whenever that task is executed. This method, however, is very wasteful of memory space. Many tasks are only being executed during short time intervals, and most of the time are idle or non existent. In addition, the execution of many tasks is mutually exclusive, such that certain tasks are never executed concurrently to certain other tasks. Since conventional memory allocation methods provide a certain amount of memory available all the time to each task, a large part of the allocated memory is never used. This is wasteful, since more memory must be built into the device than is necessary, resulting in greater cost and bulk.

The benefits of the memory allocation system according to embodiments of the invention may be illustrated by considering an exemplary device that is designed to execute five different tasks, each requiring a maximum of 1000 bytes of stack space. Of those tasks, only three are designed to execute at the same time by the device, since the execution of some tasks is mutually exclusive. Instead of allocating a separate memory stack to each of those tasks, as would be done conventionally, the present system combines all the stacks into one single memory stack having a size sufficient for three tasks, for example approximately 3000 bytes. The system according to the present invention thus results in a single contiguous memory stack carved out of the total memory available to the device. The total amount of memory contained in this single stack may be further optimized during development in a runtime environment, since each of the tasks may require less than 1000 bytes. Memory locations within this single stack can be accessible by any of the tasks executed by the embedded device. Each task can use any of the memory locations as they become available after being released by other tasks, within certain constraints that will be more fully described below. This is in contrast to the memory allocation outcome of conventional methods, in which each task is allocated a separate memory stack whether it uses it at all times or not, and is only able to access the memory stack allocated to it.

To further describe the exemplary embodiments according to the present invention, it should be noted that the operating system in this case uses tasks that can be in one of three states. At any one specific moment in time the tasks can be actively running (executing), can be suspended, or may not exist at all. The latter state means that a task, although it can be executed by the embedded device at some time, has not yet been started at the time in question, or has already been terminated. Suspended tasks are tasks that have started to be executed by the processor of the embedded device, but wherein execution has temporarily been suspended. For example, this occurs when the embedded processor, utilizing a multi tasking operating system such as one based on the OSEK standard, sequentially executes portions of different tasks to give the illusion of simultaneous execution. In reality, a task is partially executed, then it is suspended while another task is partially executed and so on, until all the tasks have been completed. The processor is thus executing only one task at any one given instant, while several more tasks may be suspended, awaiting their turn to be executed.

In order to achieve task suspension without affecting operation, each task is also associated with a context. The context includes the various system resources (typically registers and memory locations) that the task uses during execution, and thus defines the state of the environment in which the task executes. When a task is suspended, its context data is saved, i.e., the contents of the set of registers and/or memory locations used by the task are stored in a safe location, so that the next task may use these resources. In the exemplary system described herein (and as is typical in most systems), the contents of the task context are saved on the stack. When execution of the task resumes, the context information stored in the stack is restored to its original locations, thus restoring the environment for the task at the point when it was suspended.

A further distinction may be made between suspended tasks. Some tasks are suspended with their maximal (full) context being saved, while other tasks may be suspended with a minimal context. A minimal context save can be used for tasks that either always start at the same point, with the same parameters when they resume execution on the processor, or have some other mechanism to ensure that they resume execution at the proper place within the task. Tasks that are suspended with a minimal context save thus require little memory to store the context data (and a short time to save this data) while they are suspended. Tasks that require a maximal (full) context save when suspended, on the other hand, may require a significant amount of memory even though the processor is not actively executing them.

Exemplary embodiments of the present invention will now be described with reference to implementation in a system using a Motorola Power PC processor and an operating system conforming to the OSEK standard. Other types of processors and operating systems could be used. The exemplary embodiments described herein will also conform to the EABI standard, although such compliance is not required for all implementations. According to exemplary embodiments of the present invention, when a task is created it is invoked like a standard C programming language function call. For example, the following requirements are met: The stack is 8-byte aligned, and 8 bytes are allocated on the stack for a "previous stack frame" entry, so that prolog code of the task's C-language function call can save the contents of the LR register (indicating a return point or task completion) at a fixed offset from the stack pointer when the task starts.

FIG. 1 shows an exemplary schematic of memory stack entries associated with a task. The status of the stack 10 before a task is created is shown in FIG. 1(a), in which a kernel frame 14 has been stored, together with the contents of the LR register 16 and stack pointer 12, which is set to the top of the stack. The status of stack 10 after task creation is shown in FIG. 1(b), in which kernel frame 14 has been removed but LR register 16 and stack pointer 12 entries still remain. FIG. 1(c) shows stack 10 after the task is created and is actively running. Here, task frame 18 is added to stack 10, and contains runtime data used by the task. Stack pointer 12 contains the value corresponding to the top of the stack 10, which in this case is the top of stack frame 18.

Figure 2:
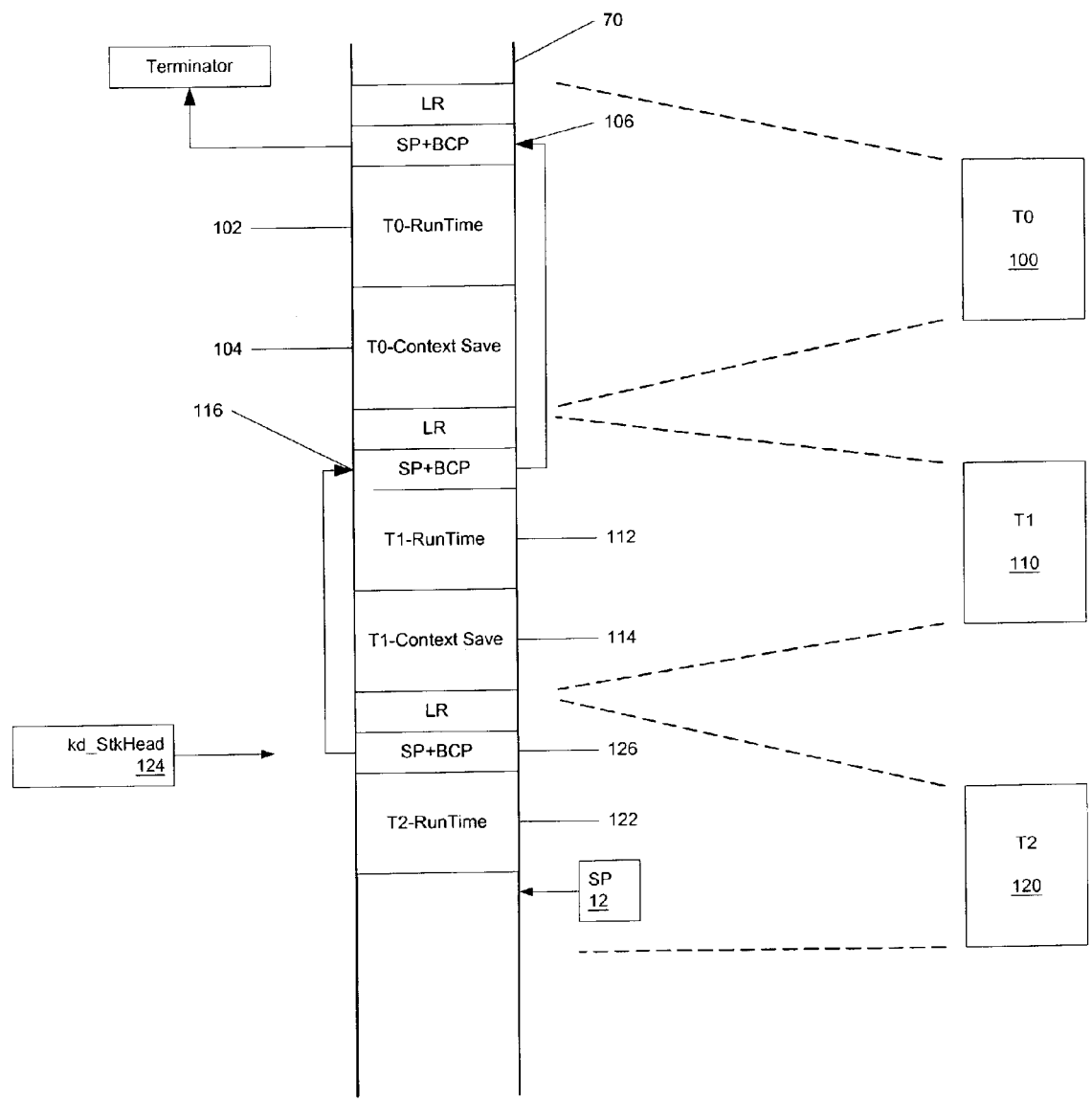
FIG. 2 is a diagram showing)memory allocation in a single stack for tasks executing according to an embodiment of the present invention.

According to the invention, a single stack is used for all the tasks carried out by the device. For this reason, a chaining technique is used to keep track of the top stack value of end of the tasks. As described above, although the device may carry out more than one task at a time, the processor can only execute one task at a time, while the other tasks carried out by the device are momentarily suspended. FIG. 2 shows an exemplary diagram of the memory used by three tasks, each having been assigned a portion of memory within the single memory stack 70. The chaining technique is particularly useful when a currently executing task terminates, and there is another task ready to resume execution. When this situation occurs, the portion of the stack of the task that terminated execution is destroyed, and the system assigns/restores a portion of the stack to the newly executing task. This can be accomplished, for example, by setting the stack pointer 12 to the top of the portion of the stack assigned to the new task, so that the portion of the stack used by the terminated task is no longer active.

As shown in FIG. 2, stack 70 contains portions of memory assigned to three tasks. Two of the tasks, task 100 (T0) and task 110 (T1), are suspended as shown in the figure, and task 120 (T2) is executing. Each portion of stack 70 includes an entry containing the contents of the LR register at task creation. In addition, each of the tasks is associated with memory in stack 70 that is used to store the runtime data necessary to execute the task. For example, this data may include the variables and parameters used by the task during execution. In the exemplary diagram, these include the memory location 102 for suspended task 100, memory location 112 for suspended task 110, and memory location 122 for executing task 120. For suspended tasks, a context save area is also saved on the stack, in order to save the contents of the task context (e.g. registers, memory). As shown in FIG. 2, context save area 104 has been saved in stack 70 for task T0, and context save area 114 has been saved on stack 70 for task T1.

According to exemplary embodiments of the present invention, a chaining technique may be used to keep track of the location of each portion of the stack assigned to the previously suspended tasks being executed in the device. The exemplary chaining technique uses three types of "links". The first "link" type is a single global variable called a "stack chain pointer" 124 representing the top stack position of the last suspended task. In the exemplary embodiment shown, the "stack chain pointer" 124 is a variable named "kd_StkHead". The second "link" type is a "back chain stack pointer" which exists within the saved memory area of each suspended task and each running task. According to the exemplary system, the "back chain stack pointer" 126 contains the value of the "stack chain pointer" 124 that existed before the "stack chain pointer" 124 was updated with a new value, during the process of suspending the current task and starting a new task. The third "link" type used in the exemplary system is the "terminating link" which represents the end of the chain. The "terminating link" indicates that there are no other suspended tasks to chain, for example using a null value.

When various tasks are created and suspended, a chain is thus formed consisting of the start of the chain defined by the "stack chain pointer" and of the linking back to each successive suspended task using the "back chain pointers". The end of the chain is defined by the "terminating link" when all suspended tasks have been linked. As shown in the drawings, the "stack chain pointer" 124 points to the executing task's "back chain pointer" 126. In turn, "back chain pointer" 126 points to the "back chain pointer" 116 of the previously suspended task T1, and "back chain pointer" 116 further points to a "back chain pointer" 106 of the previously suspended task T0. This back chaining process continues for each suspended task until there are no more suspended tasks that have to be linked together, as indicated by the "terminating link".

As an additional optimization, the back chain pointers may be stored in combination with the value of the stack pointer 12 which is stored for each task. Thus, as shown in FIG. 2, in the portion of the stack assigned to each task the entry for the back chain pointer includes the value of the stack pointer 12 saved for the task and the value of the back chain pointer. This value may be created using various transforms, as are well known (e.g., bit masks).

Figure 3:
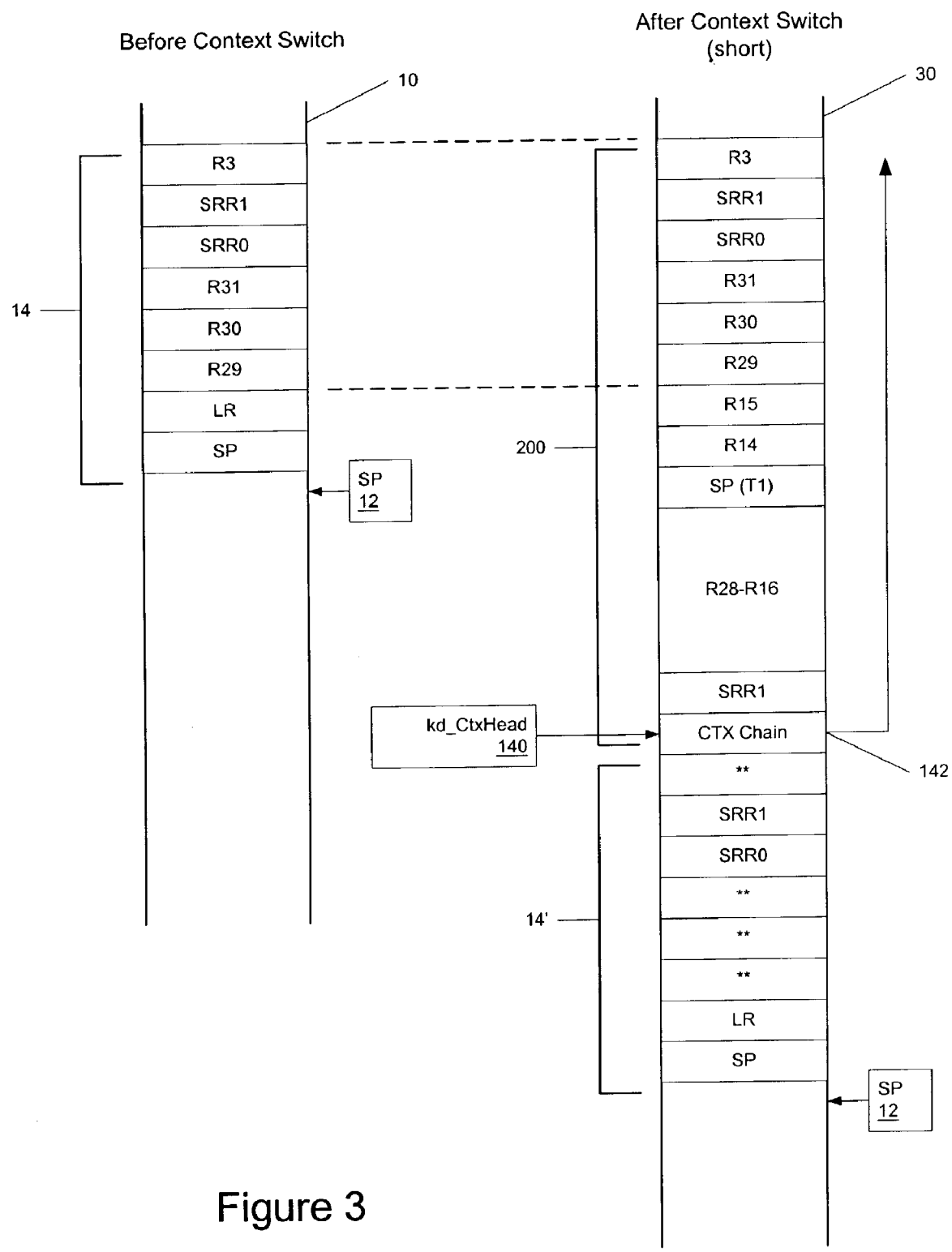
FIG. 3 is a diagram showing memory registers of a task before and after a context switch according to one embodiment of the invention.

FIG. 3 shows further detail of the effect of a context switch on the single stack. FIG. 3 shows a diagram of a memory stack 10 containing register contents for a task T1 in the executing mode as the task is being suspended by the processor, and of a memory stack 30 for the same task 10 after a context switch has taken place to execute another task. A context switch refers to the suspension of the task being currently executed by the processor, and the execution by the processor of another next-to-be-executed task. In this example the context of the first task is saved in the stack during the context switch to permit the future resumption of the task.

Difficulties may arise in managing the memory areas in the single stack where the context data is saved. For applications using the Power PC processor and an operating system based on the OSEK standard, the context data for task T1 can be saved in two different formats. Depending on the type of task, a short (minimal) format or a long (maximal) format may be used. According to the present invention, these problems are resolved by using a backwards chaining technique analogous to that described above, and by storing information regarding the start-of-context location in a global "head of chain" variable. As shown in FIG. 3, the memory areas of stack 10, as task T1 is being suspended, contain a kernel frame 14 (including the contents of SP register 12). When execution of task T1 is suspended in the processor, a memory stack 30 is formed which contains a portion of the kernel frame 14 and additional data to form saved context data 200, which is the context data needed to restore the execution environment of task T1. In the example shown in FIG. 3, context data 200 is saved in the short format, as certain of the system register contents are not saved (e.g. registers R13-R2). A context chain pointer 142 is placed between a new kernel frame 14' of a second task that is to be executed and context 200 of the first task T1.

According to exemplary embodiments of the present invention, a chaining technique which is similar to the chaining techniques already described may be used to keep track of each suspended task context. The chaining technique uses three types of "links". The first "link" type is a single global variable which may be referred to as a "context head pointer" 140, pointing to the context of the last, most recently suspended task. In the exemplary embodiment shown, the "context head pointer" 140 is named "kd_CtxHead". The second exemplary "link" type is called a "back chain context head pointer" and exists within the saved context of each suspended task. In the example, the "back chain context head pointer" 142 for task T1 contains the value of the "context head pointer" 140 which existed before the "context head pointer" 140 was updated with a new value during a context switch. The third "link" type in the example is the "terminating link" which represents the end of the chain, meaning that beyond this "link" there are no other suspended task contexts to chain.

As tasks are created and suspended, a chain is formed consisting of the start of the chain indicated by the "context head pointer" 140 and the back links to each successive suspended task defined by the "back chain context head pointers". The ending of the chain is indicated by the "terminating link", when all suspended tasks have been linked. In the exemplary embodiment, the "context head pointer" 140 points to the last suspended task's "back chain context head pointer", which in turn points to the "back chain context head pointer" of a previously suspended task. The back linking process is repeated for any other suspended tasks, until there are no more suspended tasks.

When the context switch is performed a portion of the already saved register contents of the first kernel frame 14 may become part of the saved context 200 for the first task, which will now become suspended. In an exemplary embodiment corresponding to a device utilizing a Power PC processor and implementing the EABI standard, the new kernel frame 14' located after the context area 200 need only contain new values for the SRR0 and SRR1 registers to properly conform to the EABI standard. The values of the other registers in the kernel frame are not important, because the new task has just been created instead of resuming from suspension. If the values in the context were restored, they would be meaningless to the newly created task. Another step of the context switch involves setting the stack pointer 12 to a location within the stack area so that the newly created task can use it according to the EABI standard.

Figure 4:
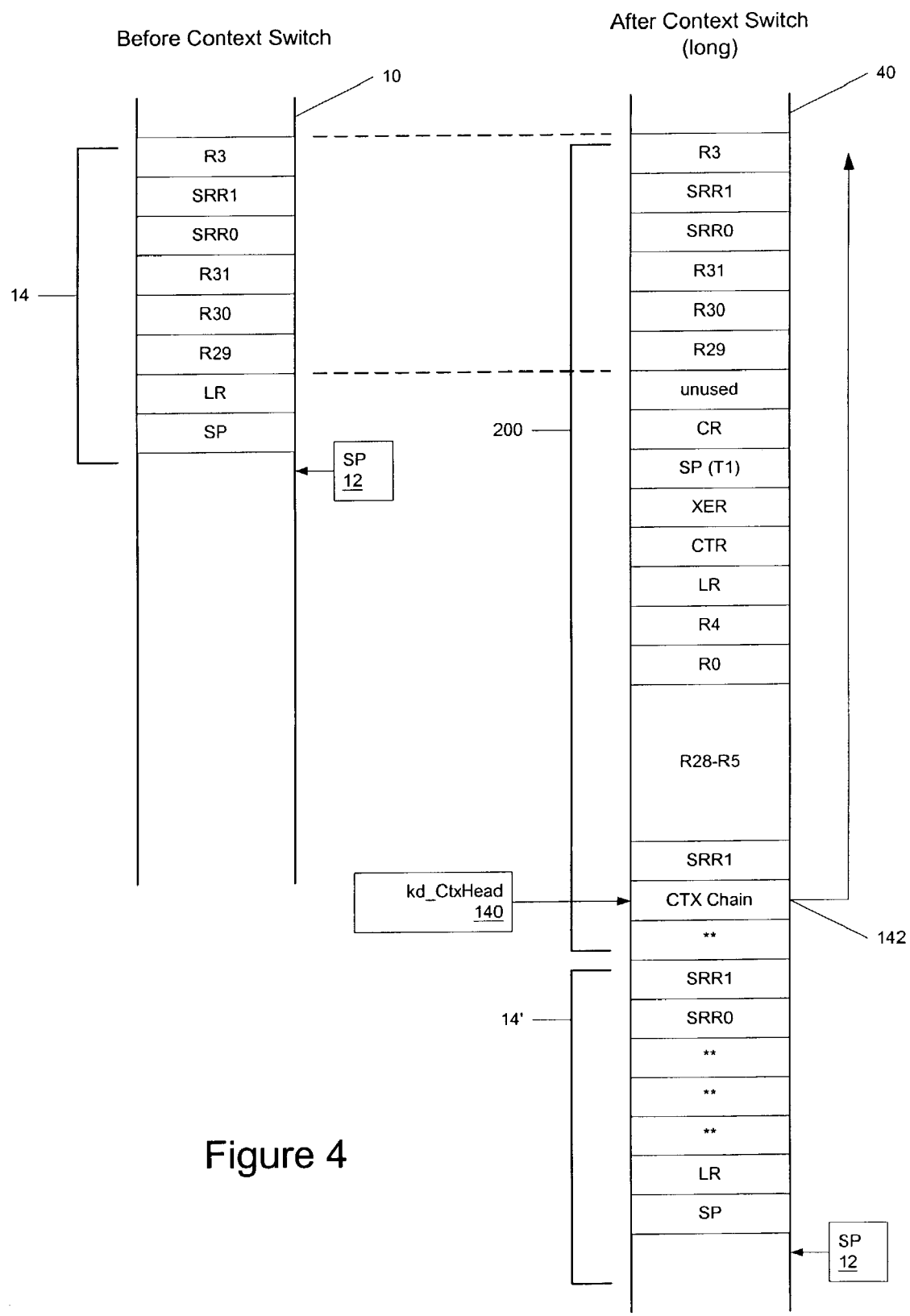
FIG. 4 is a diagram showing memory registers of a task before and after a context switch according to another embodiment of the invention.

FIG. 4 shows the stack used by task T1 before and after a context switch, and is similar to FIG. 3. Here, however, the context for the suspended task is saved in the maximal (long) format in memory stack 40. As indicated above, this example is specific to an operating system based on the OSEK standard executing on a Power PC processor, such that the operating system itself determines which type of context saving is necessary for a specific task. The context chaining technique that was described above with respect to the minimal context save is also utilized for the maximal context save, since it is irrelevant to the logic of the chaining technique which type of context is being saved. The decision of which context is actually saved is left to be determined by the operating system and by the context switch process. In the exemplary embodiment, the maximal (long) context saves the contents of all processor registers and adheres to the EABI standard. To achieve this goal, it may be necessary to provide additional "unused" space within the maximal context save area.

The ordering of the registers contents within saved context 200 may be optimized for the efficient use of multiple-word load and save instructions. This optimization is carried out in a platform specific manner, and thus depends on the processor and operating system used. In the exemplary embodiment shown in FIGS. 3 and 4, the saved context 200 is optimized for a Power PC processor operating under an OSEK-based operating system. It will be apparent to those skilled in the art that the stacks 30 and 40 would be different if optimized for use with different processors and different operating systems.

Figure 5:
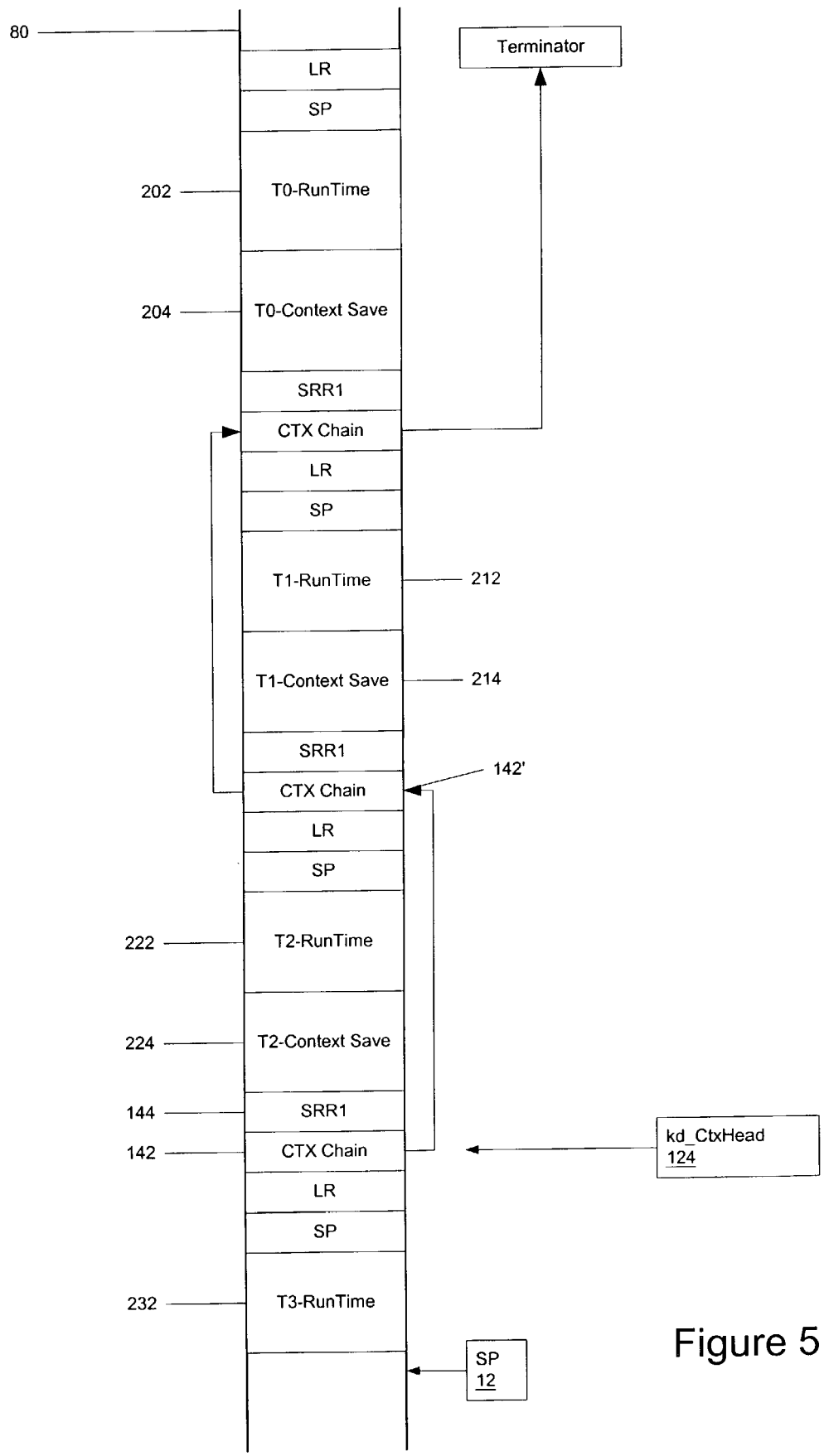
FIG. 5 is a diagram showing memory allocation in a single stack for tasks executing according to a different embodiment of the present invention.

A better understanding of the operation of the context chain can be gained with reference to FIG. 5. In the exemplary situation shown, three tasks (T0, T1 and T2) have been preempted, or suspended, while one task (T3) is executing in the processor. The contexts for the three suspended tasks T0, T1 and T2 that are saved in the stack 80 are composed of four parts. A first part is the task's run-time stack usage, described by regions 202, 212 and 222 respectively. A second part is the context save area shown as regions 204, 214 and 224 respectively. The context save areas were described more fully with reference to FIGS. 3 and 4. The third part comprises the LR and SP saved registers required for conformance to the EABI standard. The fourth part includes the SRR1 pointers 144 and the CTX Chain pointers 142 used to carry out the context chaining technique.

As shown in the exemplary embodiment, task T3 is currently executing, and thus uses stack 80 only to store its runtime stack 232. The context chain uses the context head pointer 140 to specify the first context in the chain. The first context in the chain corresponds to the last suspended task. When task T3 terminates, the operating system uses the context head pointer 140 in the process of restoring the context of, for example, the suspended task T2. During the resumption of task T2, the context head pointer 140 is updated with the contents of the "back chain pointer" 142, essentially removing a link in the context chain. Thus, the context head pointer 140 points to the memory area of the back chain pointer within last suspended task, which in this example is task T1 and back chain pointer 142'.

Special considerations are implemented when the tasks executed by the processor involve floating point operations, because of the very large amount of memory necessary to store floating point variables, and the length of time required to save and recover the data. In the case of Power PC platforms, floating point operations are typically supported by the operating system kernel. It is thus appropriate to store the contents of the floating point unit registers (the FPU context) within the stack memory rather than in a separate context area. As in the case of saving other contexts, the time necessary to save and restore an FPU context is optimized according to the invention. Since it typically takes a long time to save or restore the FPU context, a large performance improvement may be achieved if the FPU save/restore operations are performed only when they are truly necessary. Embodiments of the present invention thus use a "smart" method of determining if such FPU save/restore operation has to be carried out.

According to exemplary embodiments of the invention, the floating point context of a task is saved in the single stack by using a combination of back chaining techniques, and by keeping a record of the ownership of the FPU registers. Using the back chaining method permits the system to stack the subsequent contexts in a single memory stack, while analyzing the FPU register ownership determines whether a specific FPU context is saved or not. Exemplary logical steps used to determine whether to save an FPU context comprise the following steps:

When a task which uses FPU operations has been created, as determined by the operating system using conventional methods,
1. If there is a currently valid "owner" of the FPU, then the task context is saved.
2. A record is made that the new task is the new "owner" of the FPU.

When a task that uses FPU registers is terminated,
1. If there is a valid FPU context for the task, the context and the previous "owner" are restored. These logical steps allow tasks that do not use FPU registers to preempt other tasks that do use the FPU registers, without having to save the FPU context of the FPU-using task. A context save including the FPU registers is thus carried out when the second task which uses FPU registers is being executed by the processor.

Figure 6:
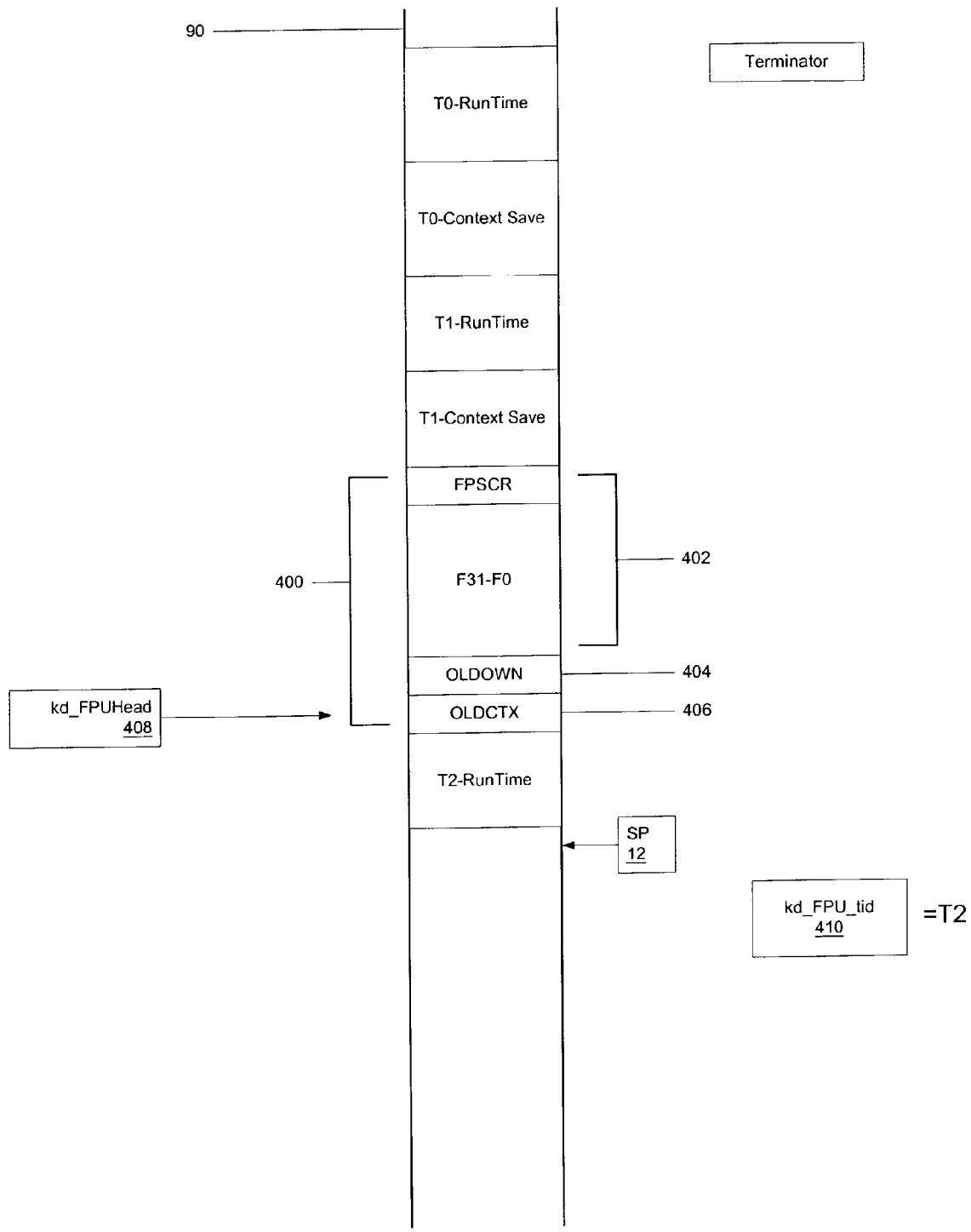
FIG. 6 is a diagram showing memory allocation in a single stack for tasks using floating point registers, according to an embodiment of the present invention.

FIG. 6 shows an exemplary diagram of a memory stack 90 which includes three tasks. In this exemplary embodiment, task T0 is suspended and does utilize the FPU registers. Task T1 is also suspended but does not use the FPU registers. When task T1 was created, its corresponding FPU context was therefore not saved. As depicted in the diagram, task T2 is currently executing. According to this example, when task T2 was created the operating system determined that it would require an FPU context. Accordingly, FPU context 400 was saved into the memory stack 90, before the task T2 stack area in order to preserve the FPU register state for task T0. FPU context 400 may contain, for example, FPU register contents 402 and various variables 404-410 used for context chaining, as described below. Once task T2 terminates, the FPU register entries 402 may be used to restore the registers, even though task T1, if it is the next task to execute, does not use the FPU registers. However, when task T1 suspends or terminates at a later time, there will be no FPU context restored even though task T0, which at that time will become the next task to execute, uses the FPU registers. This result takes place because the FPU context 402 was already restored at the time when task T2 terminated, and task T1 does not use the FPU registers.

The FPU context 400 uses a chaining technique similar to that described above with respect to context chaining. In this example, the chaining technique utilizes a global variable FPU context head pointer 408 and one or more FPU back chain pointers 406. In addition, to optimize the chaining process, variables describing the old owner 404 and a global variable identifying current owner 410 are also provided. When the FPU context 400 is saved, the identifier for current owner 410 is stored into the old owner memory location 404, and the next task using the FPU registers is stored as the current owner 410. The exemplary state shown by FIG. 6 thus represents the state of the memory stack 90, of the stack head pointer 408 and of the current owner 410 during the execution of task T2.

Although the present invention was described with reference to specific exemplary embodiments using an operating system based on the OSEK and EABI standards and a Motorola Power PC processor, the system described above can be applied with minimal changes to other platforms of similar architecture. Accordingly, the above described exemplary embodiments are to be treated as descriptive rather than limiting.

What is claimed is:

1. A system to allocate memory to tasks executed by a device, comprising:
 a memory including a stack;
 a stack head pointer to indicate locations in the memory;
 a context head pointer to indicate locations in the stack, the context head pointer specifying a location of context data for a most recently suspended task; and
 an operating system configured to:
  determine a size of the stack used by the tasks;
  assign portions of the stack to individual tasks;
  organize data elements corresponding to register contents of the device in the portions of the stack;
  set the stack head pointer to specify a top position in the stack of an executing task;
  save the register contents used by the executing task in the stack;
  modify the stack head pointer when a context switch of the tasks occurs;
  selectively store, in the stack, context data pertaining to the suspended task.

2. The system according to claim 1, wherein the operating system is further configured to modify the context head pointer when a context switch takes place.

3. The system according to claim 1, wherein the operating system is further configured to optimize the data elements organization in the stack to minimize access time to the data elements.

4. The system according to claim 1, wherein the operating system is further configured to selectively store the context data in one of a long format and a short format.

5. The system according to claim 1, wherein the stack head pointer is modified in a back chaining technique to specify the top position in the stack of successive executing tasks.

6. The system according to claim 1, further comprising instructions to define a back chain stack pointer specifying the top position in the stack of a next task of chained tasks.

7. The system according to claim 1, wherein the stack head pointer is a global variable of the device.

8. The system according to claim 1, wherein the context head pointer is a global variable of the device.

9. The system according to claim 1, wherein the context head pointer is modified in a back chaining technique to specify a top location in the stack of the context data of successive most recently suspended tasks.

10. The system according to claim 1, wherein the operating system is further configured to define a back chain context head pointer specifying the context data position, in the stack, of a next task of chained tasks.

11. The system according to claim 1, wherein the context data comprises kernel frame data of the task.

12. The system according to claim 1, wherein the stack is modified upon context switching to assign selected portions of the stack from a current suspended task and current executing task to a next to execute task and a next suspended task.

13. The system according to claim 1, wherein the operating system is further configured to selectively store, in the stack, context data containing floating point data.

14. The system according to claim 13, wherein the operating system is further configured to save the context data containing floating point data when a task using FPU-registers is created with an existing valid owner of the floating point data.

15. The system according to claim 13, wherein the operating system is further configured to restore the context data containing floating point data when a task using FPU-registers is terminated and the context data containing floating point data exists.

16. The system according to claim 13, wherein the operating system is further configured to define a FPU context head pointer specifying a location in the stack of the context data containing floating point data for successive chained tasks.

17. A method to allocate memory to tasks executing on a device, comprising:
 determining a size of a memory stack used by the tasks;
 defining portions of the stack adapted to store register contents of the tasks;
 assigning the portions of the stack to individual tasks;
 organizing data elements in the portions of the stack assigned to the individual tasks to optimize access time to the data elements;
 defining a stack head pointer to specify a top position in the stack of an executing task;
 modifying the stack head pointer when a context switch occurs;
 selectively storing, in the stack, context data relating to a most recently suspended task; and
 defining a context head pointer to indicate a location in the stack of context data for the most recently suspended task.

18. The method according to claim 17, further comprising updating the context head pointer after the context switch takes place.

19. The method according to claim 18, further comprising updating the context head pointer to specify a top position in the stack of context data for successive most recently suspended tasks.

20. The method according to claim 17, further comprising defining a back chain context head pointer specifying the location of context data for a next task of chained tasks.

21. The method according to claim 17, further comprising updating the stack head pointer in a back chaining technique to specify the top position in the stack of successive executing tasks.

22. The method according to claim 17, further comprising defining a back chain stack pointer specifying the top position of a next task of chained tasks.

23. The method according to claim 17, further comprising selectively storing in the stack context data containing floating point data.

24. The method according to claim 23, further comprising saving the context data containing floating point data when a task using FPU-registers is created with an existing valid owner of the floating point data.

25. The system according to claim 23, further comprising restoring the context data containing floating point data when a task using FPU-registers is terminated and the context data containing floating point data exists.

26. The system according to claim 23, further comprising defining a FPU context head pointer specifying a location in the stack of the context data containing floating point data for successive chained tasks.

27. A method comprising:
determining a first maximum size for memory used by a first task;
assigning to the first task a first portion of a stack, the first portion of the stack having a size equal to the first maximum size;
determining a first set of registers to be saved for the first task;
setting a stack head pointer variable to specify a top position of the first portion of the stack;
executing the first task;
determining a second maximum size for memory used by a second task;
assigning to the second task a second portion of the stack, the second portion of the stack having a size equal to the second maximum size;
performing a first context switch to execute the second task, including:
suspending execution of the first task, wherein the first task is the most recently suspended task;
selectively storing, in the stack, context data relating to the first task; and
saving contents of the first set of registers in the first portion of the stack;
saving contents of the stack head pointer variable in the first portion of the stack;
defining a first chain variable in the first portion of the stack the first chain variable initially set to a null value;
setting the stack head pointer variable to specify a top position of the second portion of the stack; and
setting a context head pointer variable to specify a location of the context data for the most recently suspended first task; and
executing the second task.

28. The method of claim 27, further comprising:
determining a second set of registers to be saved for the second task; determining a third maximum size for memory used by a third task;
assigning to the third task a third portion of the stack, the third portion of the stack having a size equal to the third maximum size;
performing a second context switch to execute the third task, including:
saving contents of the second set of registers in the second portion of the stack;
saving contents of the stack head pointer variable in the second portion of the stack;
defining a second chain, variable in the second portion of the stack, the second chain variable initially set to point to the first chain variable;
setting the stack head pointer variable to specify a top position of the third portion of the stack; and
setting the context head pointer variable to specify a location of context data for the second task: and
executing the third task.

29. The method of claim 27, further comprising:
determining whether the first task uses floating point instructions,
wherein the performing of the first context switch includes:
saving floating point registers in the first portion of the stack when the first task uses floating point registers, and not saving floating point registers in the first portion of the stack when the first task does not use floating point registers.

30. The method of claim 27, wherein the performing of the first context switch includes:
defining a floating point chain variable in the first portion of the stack and setting the floating point chain variable to a null value.

* * * * *